(12) United States Patent
Bauer et al.

(10) Patent No.: US 8,916,267 B2
(45) Date of Patent: Dec. 23, 2014

(54) ADHESIVE COMPOSITION FOR DETACHABLE ADHESIVE BONDS AND MODIFICATION OF THE ENCAPSULATION MATERIALS FOR A PURPOSEFUL ENERGY INPUT

(71) Applicants: EADS Deutschland GmbH, Ottobrunn (DE); Fraunhofer Gesellschaft zur Förderung der Angewandten Forschung E.V., München (DE)

(72) Inventors: Monika Bauer, Koenigs Wusterhausen (DE); Arnaud Concord, Munich (DE); Eike Langkabel, Wegberg (DE); Hans Luinge, Munich (DE); Georg Wachinger, Rosenheim (DE)

(73) Assignees: EADS Deutschland GmbH (DE); Fraunhofer Gesellschaft zur Förderung der Angewandten Forschung E.V. (DE)

( * ) Notice: Subject to any disclaimer, the term of this patent is extended or adjusted under 35 U.S.C. 154(b) by 149 days.

(21) Appl. No.: 13/749,277

(22) Filed: Jan. 24, 2013

(65) Prior Publication Data
US 2013/0196143 A1 Aug. 1, 2013

Related U.S. Application Data

(60) Division of application No. 13/288,544, filed on Nov. 3, 2011, now Pat. No. 8,377,245, which is a continuation of application No. PCT/EP2010/056031, filed on May 4, 2010.

(30) Foreign Application Priority Data

May 4, 2009 (DE) .......................... 10 2009 019 483

(51) Int. Cl.
| | | |
|---|---|---|
| B32B 7/12 | (2006.01) | |
| B32B 27/08 | (2006.01) | |
| C09J 11/02 | (2006.01) | |
| C09J 5/06 | (2006.01) | |
| C09J 11/06 | (2006.01) | |
| B32B 7/06 | (2006.01) | |
| C09J 11/04 | (2006.01) | |

(52) U.S. Cl.
CPC .. *C09J 11/02* (2013.01); *C09J 5/06* (2013.01); *C09J 11/06* (2013.01); *B32B 7/06* (2013.01); *C09J 2205/302* (2013.01); *C09J 11/04* (2013.01); *B32B 7/12* (2013.01)
USPC ........... 428/323; 428/343; 428/355; 428/40.1

(58) Field of Classification Search
USPC ........................................ 428/343, 355, 40.1
See application file for complete search history.

(56) References Cited

U.S. PATENT DOCUMENTS

| | | |
|---|---|---|
| 3,615,960 A | 10/1971 | Hoshii et al. |
| 5,609,954 A | 3/1997 | Aizawa et al. |

(Continued)

FOREIGN PATENT DOCUMENTS

| | | |
|---|---|---|
| DE | 19924138 A1 | 11/2000 |
| DE | 10037883 A1 | 2/2002 |

(Continued)

OTHER PUBLICATIONS

International Search Report for PCT/EP2010/056031 dated Aug. 20, 2010.

*Primary Examiner* — Samir Shah
(74) *Attorney, Agent, or Firm* — Lerner, David, Littenberg, Krumholz & Mentlik, LLP

(57) ABSTRACT

An adhesive composition for detachable adhesive bonds is based on adhesive matrices and expansion material. The particles of the expansion material are at least partially encapsulated. A bond of at least two components and an adhesive layer includes an adhesive composition based on adhesive matrices and expansion material. The bonded components may include metal, plastic, wood, glass, natural or synthetic materials or a composite material thereof.

6 Claims, 2 Drawing Sheets

(56) References Cited

U.S. PATENT DOCUMENTS

| | | |
|---|---|---|
| 6,497,787 B1 | 12/2002 | Geel |
| 6,855,760 B1 | 2/2005 | Kirsten et al. |
| 7,847,012 B2 | 12/2010 | Fujimoto et al. |
| 2003/0153671 A1* | 8/2003 | Kaszubski et al. ............ 524/492 |
| 2004/0026028 A1 | 2/2004 | Kirsten et al. |
| 2008/0213527 A1* | 9/2008 | Nonaka et al. ............... 428/41.8 |
| 2011/0039997 A1 | 2/2011 | Papon et al. |

FOREIGN PATENT DOCUMENTS

| | | |
|---|---|---|
| DE | 102004050949 A1 | 4/2006 |
| EP | 0959118 A2 | 11/1999 |
| WO | 0040648 A1 | 7/2000 |
| WO | 0075254 A1 | 12/2000 |
| WO | 2004087826 A2 | 10/2004 |
| WO | 2006042782 A1 | 4/2006 |
| WO | 2009138608 A2 | 11/2009 |

* cited by examiner

ADHESIVE COMPOSITION FOR DETACHABLE ADHESIVE BONDS AND MODIFICATION OF THE ENCAPSULATION MATERIALS FOR A PURPOSEFUL ENERGY INPUT

CROSS-REFERENCE TO RELATED APPLICATIONS

The present application is a divisional of U.S. patent application Ser. No. 13/288,544, filed on Nov. 3, 2011, which application is a continuation of International Application No. PCT/EP2010/056031 filed May 4, 2010, which claims priority from German Patent Application No. 10 2009 019 483.5 filed May 4, 2009, all of which are incorporated herein by reference.

TECHNICAL FIELD

The present invention pertains to adhesive compositions for separable adhesive bonds on the basis of adhesive matrices and encapsulated expansion materials. The invention furthermore pertains to their utilization in separable adhesive bonds and methods for producing or separating adhesive bonds in means of transport, particularly in aircraft.

BACKGROUND OF INVENTION

In the construction of aircraft, in particular, different metallic and/or non-metallic components are increasingly connected to one another by means of adhesive bonding in order to simplify the production process and to reduce the weight in relation to conventional riveted, screwed and/or welded connections. However, these adhesive bonds need to be separated again in order to repair, exchange, scrap or recycle thusly connected components. This process frequently is relatively difficult because the adhesive bonds build up a high adhesive force during their period of use and therefore can only be separated by applying high forces or high temperatures or with the aid of chemical agents, wherein the connected components are frequently damaged or even destroyed. Adhesive compositions for separable adhesive bonds are known in different variations. These compositions normally consist of an adhesive matrix (also referred to as binder matrix) and an expansion material dispersed therein. If the connected components should be intentionally separated, the expansion materials expand due to the input of energy in order to thusly weaken the adhesive bond and to simplify the separation of the components.

DE 199 61 940 A1 discloses an adhesive composition, the binder system of which incorporates substances that can be thermally activated and are able to trigger a debonding process. These thermally activatable substances are solid at room temperature and homogenously distributed in the binder matrix in the form of fine particles. When exposed to heat, these substances should cause swelling of the binder matrix, undergo a phase transformation, be decomposed and/or produce gases or water vapor. Adhesive compositions for realizing adhesive bonds that can be separated again due to a pyrolysis of incorporated expansion materials are furthermore described in U.S. Pat. No. 3,615,960, WO 00/40648 A1 and DE 10 2004 050 949 A1.

In their cured state, however, these adhesive compositions frequently only have a low stability when they are subjected to high temperatures, water or chemical attacks such that the expansion agent may prematurely expand and already lead to inadvertent weakening of the adhesive bond during its period of use. In addition, the curing reaction of these adhesive compositions frequently is already impaired because a reaction between the expansion material and other components of the uncured adhesive matrix or the adhesive matrix itself may already occur during the storage of the composition or during the curing process. Furthermore, the separation of the adhesive bonds and the connected components frequently requires high temperatures over a long period of time such that these components may be overheated and therefore damaged or destroyed.

Consequently, there still is a need for adhesive compositions for separable adhesive bonds that have a sufficient chemical and thermal stability in the uncured state, as well as in the cured state. Furthermore, these adhesives should develop a sufficient adhesive force during their period of use in adhesive bonds, but also be easily separable on demand.

SUMMARY OF INVENTION

An aspect of the present invention makes available adhesive compositions for separable adhesive bonds that have a sufficient adhesive force during their period of use, but can be easily separated on demand without damaging or destroying the connected components. Another aspect is that the adhesive compositions have a mechanical stability that is at least equivalent to that of conventional adhesive compositions. According to yet another aspect, these adhesive compositions are easy to apply and have a sufficient chemical and thermal stability in the cured state. Another aspect is that the adhesive compositions also have a sufficient chemical and thermal stability in the uncured state such that an improved storage stability is ensured. According to yet another aspect, the adhesive compositions ensure an adhesive bond with improved ageing properties and therefore a long period of use.

DETAILED DESCRIPTION OF THE INVENTION

Figure 1:
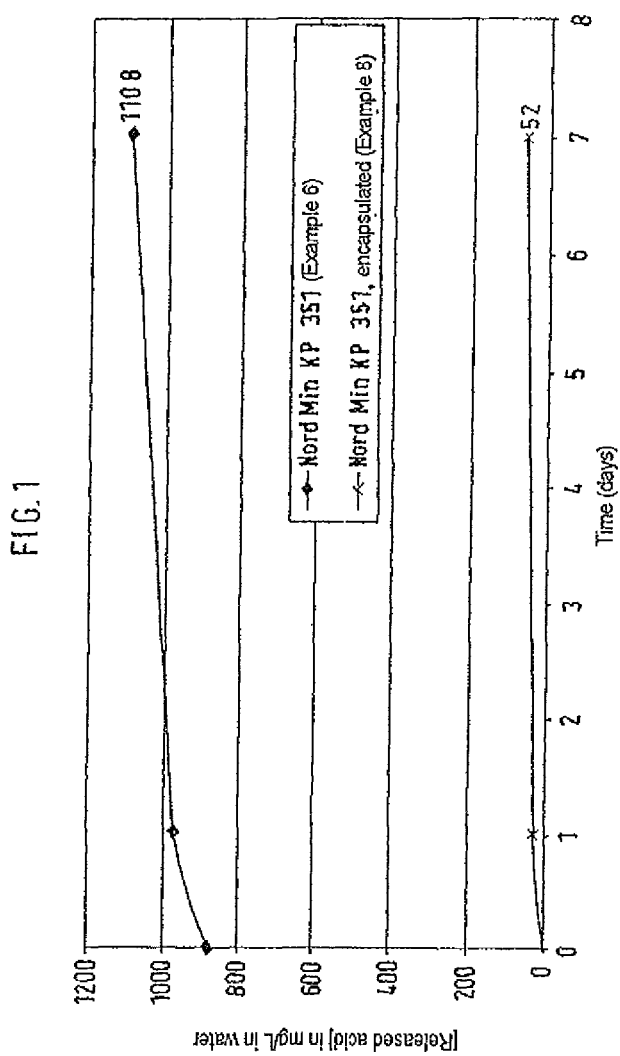
FIG. 1 shows the quantity of released acid in water for the expansion materials of Example 6 and Example 8.

According to one aspect of the invention, adhesive compositions are proposed, wherein at least one expansion material, the particles of which are at least partially encapsulated, is embedded in an adhesive matrix. In this case, the shell material of the encapsulated expansion material and may furthermore comprise other additives such as active fillers. These compositions can be applied onto any surfaces of components to be bonded, particularly in applications in the aircraft industry.

In contrast to the prior art, the inventive adhesive compositions for separable adhesive bonds comprise an adhesive matrix and an expansion material dispersed/incorporated therein, wherein the particles of the expansion material are at least partially, preferably completely encapsulated and/or coated.

Due to the utilization of encapsulated expansion materials, the inventive adhesive compositions for separable adhesive bonds have a number of improved properties. It should initially be noted that the separation of corresponding adhesive bonds can be realized without damaging or destroying the bonded components or their surfaces, respectively. The input of energy required for separating the adhesive bonds can also be realized purposefully such that thermal stress on or overheating of the bonded components is avoided. In addition, the amount of energy to be input for separating the adhesive bonds is reduced in comparison with conventional adhesive compositions. Furthermore, the adhesive compositions have excellent adhesive properties in adhesive bonds after the curing process. These excellent adhesive properties manifest themselves in the form of a prolonged storage stability and period of use, wherein the adhesive force also remains constant over extended periods of use and a premature inadvertent separation of correspondingly bonded components therefore is prevented. The cured adhesive compositions are also stable under high and low temperatures and mechanical stresses as they usually occur in aeronautics. These compositions are furthermore stable in the presence of moisture, hydraulic fluids such as Skydrol, kerosene and anti-freezing compounds. In addition, the adhesive compositions also ensure an improved stability of the uncured composition such that a simpler and more cost-effective storage of the adhesives can be achieved.

Adhesives that are normally used in industrial applications and, in particular, in aeronautics may be used as adhesive matrix (also referred to as binder matrix) of the inventive adhesive compositions. In this case, the properties of the adhesive matrix can be chosen in dependence on the respective application in order to vary, e.g., the adhesive force, the temperature stability at high or low temperatures, the deformability, the elasticity or the stability in the presence of moisture, chemicals and mechanical stresses.

In a few embodiments, physically curing adhesives may be used as inventive adhesive matrix. These include hot-melt adhesives, solvent adhesives, contact and dispersion adhesives, water-based adhesives as well as plastisols. In this case, particularly preferred adhesive matrices are those on the basis of ethylene-vinyl acetate copolymers, polybutene, styrene-isoprene-styrene or styrene-butadiene-styrene copolymers, thermoplastic elastomers, amorphous polyolefins, linear thermoplastic polyurethanes, copolyester, polyamide resins, polyamide/EVA copolymers, polyaminoamides on the basis of dimeric fatty acids, polyester amides and polyether amides or mixtures thereof.

In other embodiments, reaction adhesives such as polymerization adhesives, polyaddition adhesives and polycondensation adhesives can be used as adhesive matrix. These include acrylate adhesives such as cyanoacrylate adhesives and methyl-methacrylate adhesives, anaerobically curing adhesives, unsaturated polyester adhesives, radiation-curable adhesives, phenol formaldehyde adhesives, silicone adhesives, silane-curing polymer adhesives, polyimide adhesives, epoxy resin adhesives and polyurethane adhesives.

In this context, the term single-component adhesive refers to adhesive compositions that contain corresponding adhesive monomers as well as curing agents, wherein the adhesive cures due to a change of ambient conditions. This may be realized, for example, in the form of a temperature increase, the admission of humidity, the exclusion of atmospheric oxygen or contact with the substrate surface. The term two-component adhesive, in contrast, refers to adhesive compositions, in which the corresponding adhesive monomers and the curing agents are stored separately and only thoroughly mixed in the correct ratio shortly before their application. The contact between the adhesive monomers and the curing agent starts the chemical reaction into an adhesive polymer.

In this case, the adhesive matrices are preferably based on single-component or two-component polyurethanes, single-component or two-component polyepoxies, single-component or two-component silicone polymers, silane-modified polymers and (meth)acrylate-functional and cyanoacrylate-functional reaction adhesives or mixtures thereof.

Particularly preferred embodiments of the present invention comprise, in particular, single-component or two-component polyepoxy adhesives, as well as single-component or two-component polyurethane adhesives and single-component or two-component acrylate adhesives such as, e.g., metal methacrylate adhesives or cyanoacrylate adhesives as adhesive matrix. In addition, any adhesive matrix that forms a sufficiently homogenous mixture with the encapsulated expansion material may be used for the inventive invention.

The adhesive matrix of the inventive adhesive composition may be present in a quantity of 50 to 99% by weight, preferably in a quantity of 65 to 99% by weight, particularly in a quantity of 80 to 99% by weight, respectively referred to the total weight of the adhesive composition.

The group of expansion materials preferred for producing the inventive adhesive compositions includes expansion materials that expand under the input of energy. In this context, the term expansion material refers, in particular, to materials that sufficiently expand for weakening corresponding adhesive bonds under the input of thermal energy into the adhesive matrix. This refers to expansion materials that decompose under the input of energy and produce gases such as, for example, nitrogen or carbon dioxide in order to thusly expand the expansion material. However, this also refers to expansion materials comprising additional reagents that evaporate in an undecomposed fashion under the input of energy and therefore also lead to an expansion of the expansion material. These gaseous or liquid additional reagents once again mechanically attack the expansion material and lead to further expansion of the expansion material, during which additional or new gases are released. The input of energy may be realized with any form of energy such as, for example, by means of an increased temperature or inductively with the aid of an electric field, a magnetic field, an electromagnetic field, an electric alternating field, a magnetic alternating field or an electromagnetic alternating field, as well as by means of IR, UV or microwave energy.

In addition, it is preferred to use expansion materials that only expand at temperatures between about 140 and 300° C., preferably temperatures between about 160 and 250° C., particularly temperatures between about 180 and 220° C., i.e., temperatures that lie above the operating temperature of conventional adhesive bonds used in aeronautics, and are non-toxic.

Consequently, expansion materials according to the present invention are all natural, semi-synthetic and synthetic materials, particularly inorganic and/or organic expansion materials, that sufficiently expand for separating an adhesive bond under the conditions used.

In certain embodiments, the materials usable for the production of the inventive expansion materials comprise foamable materials, expanding agents and intumescent materials, wherein the term intumescent materials refers to materials, the volume of which increases and/or the density of which decreases under the input of heat.

In one preferred embodiment, the organic expansion material is selected from the group consisting of azoisobutyronitrile (AIBN), azodicarbonamide (ADC), dinitrosopentamethylenetetramine (DPT), benzenesulfonyl hydrazide, N,N'-dinitroso-N,N'-dimethylterephthalamide, p,p-oxy-bis-benzenesulfonyl hydrazide (OBSH), p-toluenesulfonyl hydrazide (TSH), 5-phenyltetrazole (5-PT), sulfonyl semicarbazide such as, e.g., p-toluenesulfonyl semicarbazide (PTSS) or mixtures thereof. This group of organic expansion materials decomposes under a sufficient energy input and preferably produces nitrogen and/or volatile hydrocarbons or carbon dioxide that leads to an expansion of the expansion material and therefore to a weakening of the adhesive bond.

In another embodiment, the materials used for producing the inventive expansion materials comprise inorganic expansion materials to be selected from the group consisting of expandable graphite (EG), mica, vermiculite, hydrotalcite or mixtures thereof. This group of inorganic expansion materials preferably includes additional reagents such as, e.g., acids that evaporate in an undecomposed fashion under the input of energy and therefore lead to an expansion of the expansion material. In addition, the released acid vapors, as well as the liquid acid, may also chemically attack the embedded expansion material, particularly at high temperatures, and release additional or new gases such that the expansion material is expanded further.

One particularly preferred embodiment of the invention comprises azodicarbonamide (ADC) as organic expansion material. Another particularly preferred embodiment of the present invention comprises expandable graphite (EG) as inventive inorganic expansion material. Other embodiments comprise mixtures of the above-described inorganic and organic expansion materials.

According to the invention, the expansion materials are present in particulate form, wherein the particles of the expansion material are at least partially encapsulated. It is preferred that the expansion materials essentially are completely encapsulated or coated. In the context of the present invention, the term encapsulated expansion material refers to expansion materials that are respectively protected from an inadvertent and premature expansion or from moisture, as well as chemical and thermal attacks, by a shell material or a coating. The shell material or coating material of the encapsulation therefore could consist of materials that form a durable shell or layer around the expansion material such that the expansion material enclosed therein is protected from the adhesive matrix and other chemical reagents such as kerosene, hydraulic fluid and moisture before and after the curing process. Furthermore, the corresponding shell material or coating material also protects the adhesive matrix from the expansion materials before and after the curing process in that, e.g., reactive components of the expansion material or additional reagents enclosed therein are prevented from reacting with components of the adhesive matrix. The shell material or coating material of the inventive expansion materials preferably also has a sufficient thermal stability for ensuring the protection of the expansion material enclosed therein and preventing its premature expansion, e.g., in a typical temperature range occurring in aeronautics. In addition, the shell material or coating material preferably can be expanded or shattered when the expansion material expands such that the expansion material is able to completely expand in order to separate the adhesive bond.

Consequently, materials that, in particular, essentially do not melt, deform, dissolve or shatter/tear open under the pressure or the high or low temperatures normally occurring in aeronautics, i.e., materials that are stable under the normal operating conditions of the connected components, may be used as shell material or coating material of the encapsulation. In addition, materials that are non-toxic, remain stable in the adhesive matrix and essentially do not negatively influence the mechanical properties thereof are preferred as shell material or coating material of the encapsulation. Consequently, all inorganic or organic materials that have a sufficient stability under the conditions used are suitable shell materials or coating materials of the encapsulation.

In certain embodiments, polymers on the basis of phenol formaldehyde resin, urea formaldehyde resin, melamine formaldehyde resin, epoxy resin, polyester resin, vinyl chloride/acrylonitrile copolymers, polyvinyl alcohol, polyvinyl butyral, polymethylmethacrylate, polyacrylonitrile, polyvinyl chloride, polystyrene, organic-inorganic hybrid systems, ceramics, glass, metal oxides and thermoplastic polymers, particularly those selected from the group consisting of low density polyethylene (LDPE), high density polyethylene (HDPE), polyethylene terephthalate (PET), polypropylene (PP), polystyrene (PS), polycarbonate (PC), polyester (PE), polyamide (PA), polylactate (PL), polymethylmethacrylate (PMMA), nylon and acrylonitrile-butadiene-styrene (ABS), acetal, acrylic acid, cellulose acetate (CA), cellulose acetate butyrate (CAB), ethylene vinyl acetate (EVA), phenylene oxide-based polymers, polycarbamide polymers, polysulfone polymers and ethylene-acrylic acid copolymers (EAA), ethylene-methacrylic acid copolymers (EMA), polyvinyl chloride (PVC) and ethylene-based copolymers that are neutralized with metallic salts (ionomers) or mixtures thereof, may be used as shell material or coating material of the encapsulated expansion material.

In particularly preferred embodiments, the shell material or coating material of the encapsulated expansion material is selected from the group consisting of glass, melamine formaldehyde resin, parylene, organic-inorganic hybrid systems, cyanate-based polymers, ceramics, metal oxides or mixtures thereof. In addition, any shell material or coating material may be used that ensures sufficient protection of the expansion agent from the adhesive matrix, moisture and other chemical agents, as well as high and low temperatures.

Particularly preferred embodiments of the present invention comprise single-component or two-component polyurethane adhesives as adhesive matrix and azodicarbonamide (ADC) as organic expansion material, wherein the shell material of the expansion material comprises a melamine formaldehyde resin. Another particularly preferred embodiment of the present invention comprises single-component or two-component polyepoxy adhesives as adhesive matrix and expandable graphite (EG) as inorganic expansion material, wherein the shell material of the expansion material comprises melamine formaldehyde resin.

The content of encapsulated expansion material used in accordance with the invention may vary within a broad range, but should lie in a range, in which the adhesive compositions can build up a sufficient adhesive force in the adhesive bonds. In a few embodiments, the quantitative proportion of the encapsulated expansion material therefore should be no higher than 45% by weight, preferably no more than 30% by weight, particularly no more than 15% by weight, respectively referred to the total weight of the adhesive composition.

The encapsulated expansion material should also be added in such quantities that a sufficient expansion for separating the adhesive bonds is achieved after the input of energy. The quantitative proportion of the encapsulated expansion material therefore preferably lies in a quantitative range of at least 1% by weight, preferably in a quantitative range of at least 5% by weight, particularly in a quantitative range of at least 7.5% by weight, respectively referred to the total weight of the adhesive composition.

Certain embodiments therefore comprise 1 to 45% by weight, particularly 5 to 30% by weight, particularly 7.5 to 15% by weight, of the encapsulated expansion material respectively referred to the total weight of the adhesive composition.

The shell material or coating material of the encapsulated expansion material of the present adhesive compositions is adjusted such that it has a sufficient thermal stability. The shell material of the encapsulated expansion material preferably ensures that the expansion material is stable at the temperatures that usually occur during the curing of adhesive compositions in adhesive bonds.

In certain embodiments, the shell material or coating material of the encapsulated expansion material ensures a thermal stability for at least 2 hours at a temperature of 180° C., preferably for at least 2 hours at a temperature of 190° C., particularly for at least 2 hours at a temperature of 200° C., during the curing process. The shell material or coating material of the encapsulated expansion material particularly ensures a thermal stability for a period of 2 hours at a temperature up to 180° C.

In another preferred embodiment of the present invention, the shell material or coating material of the encapsulated expansion material ensures a permanent thermal stability in a typical operating range for aeronautics. In one particularly preferred embodiment, the inventive expansion material therefore ensures a permanent thermal stability up to a temperature of 100° C., preferably up to a temperature of 120° C., particularly up to a temperature of 140° C. The expansion material of the present invention also provides a sufficient stability at low temperatures, preferably to a temperature as low as −50° C., especially to a temperature as low as −75° C., particularly to a temperature as low as −100° C.

Certain embodiments of the present invention therefore have a permanent stability in a temperature range between −50° C. and 100° C., preferably in a range between −75° C. and 120° C., particularly in a range between −100° C. and 140° C.

The particles of the expansion material preferably are at least partially present in encapsulated form, i.e., the expansion material is at least partially enclosed by a shell material or coating material. In a preferred embodiment, 70 to 100% of the surface of the expansion material are covered with the shell material or coating material, preferably 80 to 100%, especially 90 to 100%, particularly 95 to 100%. In a particularly preferred embodiment, the expansion material is completely enclosed in the shell material or coating material.

The encapsulated expansion materials generally have an average particle size <1 mm, preferably a particle size <500 µm, especially a particle size <250 µm, particularly a particle size <100 µm. However, the average particle size of the encapsulated expansion materials should be smaller than the layer thickness of the adhesive layer of the respective cured adhesive compositions. The micro-encapsulated expansion materials preferably have an average particle size of 1 to 150 µm, particularly a particle size between 1 and 75 µm.

In a preferred embodiment of the present invention, the encapsulated expansion materials have a sufficient stability under the mechanical stresses in a typical operating range for aeronautics. The stability of the encapsulated expansion materials under mechanical stresses particularly is at least equivalent to that of conventional adhesive compositions. In another preferred embodiment, the stability of the encapsulated expansion materials under mechanical stresses is improved in comparison with that of conventional adhesive compositions.

The shell material or coating material of the encapsulated expansion material of the inventive adhesive compositions may comprise an additional component in the form of one or more active fillers.

The main function of the active fillers in the shell material or coating material of the encapsulated expansion material of the adhesive compositions usually is the purposeful transmission of energy to the expansion material such that it can heat up and expand faster at a sufficient energy input and the adjoining components are not overheated. In this case, the active fillers are distributed in the shell material or coating material in such a way that they are only situated at the locations, at which their effect is required during the separation of an adhesive bond. Consequently, the active fillers preferably are in direct contact with the expansion materials, on which they should develop their effect. Nonspecific heating of the entire adhesive layer and adjoining components therefore is prevented during a heating process. Due to the purposeful input of energy, the time that elapses before the expansion of the expansion material and the subsequent separation of the adhesive bond may also be reduced.

All organic or inorganic compounds, salts, metals, metal compounds or materials that are capable of an energy input and have a sufficient stability in the shell material or coating material of the encapsulated expansion material basically may be considered as active fillers in the shell material or coating material of the encapsulated expansion material.

Among these active fillers, the metals and metal compounds are preferred in certain embodiments. These may consist of ferromagnetic or ferrimagnetic, superparamagnetic or piezoelectric materials or of materials with high thermal capacity.

In certain embodiments, examples of suitable active fillers comprise barium titanate, ethylenediaminetartrate, potassium-sodium tartrate, potassium tartrate, lithium sulfate, sodium tartrate, quartz, tourmaline, ferroelectrics with perovskite structure and lead-zirconium titanate, as well as the metals aluminum, cobalt, iron, copper, nickel or their alloys and metal oxides of the type n-maghemite ($\gamma$-Fe2O3), n-magnetite (Fe3O4), ferrites of the general formula MeFe2O4, in which Me stands for bivalent metals of the group cadmium, calcium, cobalt, copper, magnesium, manganese, nickel or zinc, as well as beryllium, boron, calcium, graphite, potassium, magnesium, phosphorus or compounds of the aforementioned materials, particularly aluminum oxide and aluminum chloride, calcium carbonate, calcium chloride, hematite, copper sulfate, magnetite, magnesium carbonate and magnesium chloride, phosphorus chloride, phosphorus oxide or mixtures thereof.

Particularly preferred embodiments comprise copper, graphite and ferrites of the general formula MeFe2O4, in which Me stands for bivalent metals of the group cadmium, calcium, cobalt, copper, magnesium, manganese, nickel or zinc, or mixtures thereof as active filler for modifying the shell material or coating material of the encapsulated expansion material.

The value of the energy input into the expansion material can be defined and varied with the quantitative proportion of the active filler in the shell material or coating material of the encapsulated expansion material because the attainable temperature and the heating rate is dependent on the concentration and the type of the active filler. If the quantity of the active filler in the shell material or coating material of the inventive expansion material is increased, correspondingly higher temperatures and shorter heating rates can be achieved.

The content of additional active fillers used in the inventive expansion material therefore may vary within a broad range, but should lie in a range, in which overheating of connected components is prevented. In a few embodiments, the quantitative proportion of the active filler in the shell material or coating material of the encapsulated expansion material therefore should be no higher than 50% by weight, preferably no higher than 20% by weight, particularly no higher than 10% by weight, respectively referred to the total weight of the encapsulated expansion material.

The active filler should also be added in such quantities that a sufficient energy input into the encapsulated expansion material for separating the adhesive bonds can be achieved. Consequently, the quantitative proportion of the active filler in the shell material or coating material of the encapsulated expansion material is at least 0.1% by weight, preferably at least 1% by weight, particularly at least 2% by weight, respectively referred to the total weight of the expansion material.

Certain embodiments therefore comprise preferably 0.1 to 50% by weight, especially 1 to 20% by weight, particularly 2 to 10% by weight, of the active filler in the shell material or coating material of the inventive expansion material respectively referred to the total weight of the encapsulated expansion material.

The active fillers in the shell material or coating material of the encapsulated expansion material generally have an average particle size <400 nm, preferably a particle size <250 nm, especially a particle size <100 nm, particularly a particle size <50 nm. However, the average particle size of the active fillers should be smaller than the layer thickness of the shell material or coating material of the inventive expansion materials. The active fillers preferably have an average particle size of 1 to 100 nm, particularly between 2 and 25 nm.

These inventive encapsulated expansion materials can be manufactured with any established methods that make it possible to encapsulate or coat the expansion material. Such an encapsulation of the expansion material can be achieved, in particular, with all established microencapsulation methods, particularly with interfacial surface polymerization, in-situ polymerization or matrix polymerization. Methods for encapsulating or coating materials such as the fluidized bed technology, coacervation, spray drying or Sol-Gel methods are particularly suitable.

In addition, mixable additives such as, e.g., curing agents, accelerators, catalysts, additional resins for improving the adhesive properties, thixotropic agents, softeners, tougheners, adhesive additives, stabilizers, dyes, tensides, modifiers, fillers, solvents and the like that are normally used in adhesive compositions, but do not deteriorate the essential properties of the compositions, may be added to the adhesive compositions according to the present invention as required.

The inventive adhesive compositions may be used for connecting and separating components of metal, plastic, particularly thermally stable plastic, wood, glass, natural or synthetic materials or composite materials thereof. They may therefore be considered for bonding or connecting components in indoor and outdoor areas, pieces of furniture, doors, window frames, industrial components for private and industrial use, as well as for components in means of transport of any type including aircraft, motor vehicles and ships. In this respect, applications in the field of aeronautics are particularly preferred.

The adhesive compositions according to the present invention can be directly applied onto the components to be connected in the form of a liquid, wherein an adhesive layer is formed of the respective adhesive composition. In one embodiment, the adhesive compositions preferably can only be applied onto the surface of one component that should be connected to the surface of another component and is subsequently brought in contact therewith. In another embodiment, the adhesive compositions can be applied onto the surfaces of two or more components to be connected that are subsequently brought in contact with one another. In another embodiment, a layer of the respective adhesive composition can initially be formed and dried on a flexible film. Subsequently, this dry film can be used for fastening/bonding the components to be connected.

In this case, the application of the adhesive compositions may take place in any form as long as it is ensured that the adhesives coat the surfaces of the components in the desired fashion. For example, the adhesive compositions may be applied by means of spraying or with a brush or roller or are simply poured onto the surfaces. Another option consists of immersing the components to be connected in the adhesive compositions.

A method for bonding components may comprise applying an inventive adhesive composition onto the surface of at least one component with conventional methods and bringing the components to be bonded in contact with one another. The corresponding adhesive bond comprising an adhesive layer and at least two components can then be heated to a temperature, at which the cross-linking of the adhesive matrix begins, by means of an increased temperature or inductively with the aid of an electric field, magnetic field, electromagnetic field, electric alternating field, magnetic alternating field or electromagnetic alternating field and the adhesive composition can be cured.

The time that elapses until the adhesive compositions in the adhesive bond cure can vary depending on the composition and optionally used active fillers. In the inductive methods, the curing time may lie between the range of seconds and the range of minutes while complete curing can in most cases be achieved within 2 hours with thermal curing methods. The inventive adhesive compositions therefore are also particularly suitable for curing sensitive components. This method is also very efficient energetically.

The bond of components obtained by curing the inventive adhesive compositions therefore comprises at least two components and one adhesive layer in the form of an adhesive bond, wherein the adhesive layer comprises an inventive adhesive composition.

In a few embodiments, the inventive method for separating an adhesive bond produced by curing the inventive adhesive compositions may be carried out in such a way that the cured adhesive layer of the adhesive bond is heated to the temperature required for an expansion of the encapsulated expansion material, namely by means of an increased temperature or inductively with the aid of an electric field, magnetic field, electromagnetic field, electric alternating field, magnetic alternating field or electromagnetic alternating field. In other embodiments, the energy input required for the expansion of the encapsulated expansion material may also be realized with IR, UV or microwave energy. If the energy input is realized with microwave energy, the separation of the adhesive bonds may already take place within a few minutes (e.g., 10 s to 5 min).

In this case, the encapsulated expansion material incorporated in the adhesive layer of the adhesive bonds is heated to a temperature that suffices for causing an expansion of the expansion material embedded therein such that the connected components can be separated from one another. In one particularly preferred embodiment, the components ultimately can be separated from one another manually. If the adhesive compositions additionally incorporate active fillers, the cured adhesive layer of the respective adhesive bond can be heated to a temperature, at which the active fillers transmit sufficient energy to the enclosed expansion material for achieving an expansion thereof such that the connected components can be separated from one another.

In this context, the separation of the adhesive bonds may be carried out with devices that are normally used for these purposes. The respectively required devices, parameters and device adjustments depend on the adhesive composition used. In addition, the temperature required for the separation depends on the thermal stability of the respective encapsulated expansion material and optional active fillers, as well as their content in the adhesive matrix. The input of energy and therefore also the separation of the adhesive bond takes place in a particularly effective fashion due to the local vicinity of the shell material or coating material and the optional active fillers to the expansion material enclosed in the shell material or coating material.

Examples of advantageous embodiments of the inventive adhesive compositions are described below, wherein %-specifications are indicated in the form of % by weight referred to the total weight of the adhesive composition like all other %-specifications in this description:

EXAMPLE 1

Reference Samples

Components of a carbon fiber reinforced plastic composite material (CFRP) were brought in contact with a polyurethane adhesive composition (Pliogrip 9400/9405 of the firm Ashland) and the adhesive bond was produced and cured in accordance with Standard DIN EN 1465.

The combined tension and shear resistance was tested on part of these samples at room temperature (RT; about 20° C.). The combined tension and shear resistance of the reference samples corresponded to (15.5+/−1.3) MPa. Another part of the reference samples was stored for 10 min at 200° C. After they had cooled to RT, these samples were tested at RT. The combined tension and shear resistance of the reference samples corresponded to (19.3+/−0.4) MPa. This increase in the combined tension and shear resistance corresponds to a normal post-curing affect.

EXAMPLE 2

Adhesive bonds were produced as described under Example 1 and cured, wherein 10% by weight of azodicarbonamide (ADC; Porofor® ADC M/C1 of the firm Lanxess AG, Leverkusen, Germany) were homogenously admixed to the polyurethane adhesive as expansion material with the aid of a speed mixer. The combined tension and shear resistance was tested on part of these samples at RT. The combined tension and shear resistance of the samples corresponded to (17.3+/−2.0) MPa.

Another part of these samples was stored for 10 min at 200° C. After they had cooled to RT, these samples were tested at RT. The combined tension and shear resistance of the samples corresponded to (0.45+/−0.03) MPa.

EXAMPLE 3

Adhesive bonds were produced as described on the Example 1 and cured, wherein 10% by weight of azodicarbonamide (ADC; Porofor® ADC M/C1 of the firm Lanxess AG, Leverkusen, Germany) were homogenously admixed to the polyurethane adhesive as expansion material with the aid of a speed mixer, and wherein the azodicarbonamide was encapsulated with melamine formaldehyde (MF) (commercially available from the firm Pharmarom GmbH) by means of coacervation.

The combined tension and shear resistance was tested on part of these samples at RT. The combined tension and shear resistance of the samples corresponded to (20.2+/−1.3) MPa. Another part of these samples was stored for 10 min at 200° C. After they had cooled to RT, these samples were tested at RT. The combined tension and shear resistance of the samples corresponded to (0.69+/−0.07) MPa.

Example 3 shows that, in comparison with a reference sample (Example 1) or a sample, in which the expansion material is not encapsulated or coated (Example 2), an adhesive composition according to the present invention develops an excellent adhesive force in adhesive bonds and simultaneously ensures improved ageing phenomena and a long period of use. In addition, these adhesive bonds are easily separable such that connected components are neither damaged nor destroyed.

EXAMPLE 4

Reference Samples

Components of a carbon fiber reinforced plastic composite material (CFRP) were brought in contact with a polyepoxide adhesive composition consisting of the DGEBA resin Epikote Resin 162 of the firm Hexion, the polyaminoamide curing agent Polypox P502 of the firm UPPC, the ATBN toughener Hycar 1300×16 of the firm Emerald and the thixotropic agent Aerosil R805 of the firm Degussa-Hills, and the adhesive bond was produced and cured in accordance with Standard DIN EN 1465.

The combined tension and shear resistance was tested on part of these samples at RT. The combined tension and shear resistance of the reference samples corresponded to (23.6+/−2.9) MPa.

Another part of these samples was stored for 10 min at 200° C. After they had cooled to RT, these samples were tested at RT. The combined tension and shear resistance of the samples corresponded to (29.9+/−2.3) MPa.

EXAMPLE 5

Adhesive bonds were produced as described under Example 4 and cured, wherein 10% by weight of the expandable graphite NordMin KP 251 (Nordmann & Rassmann) were homogenously admixed to the polyepoxide adhesive as expansion material with the aid of a speed mixer.

The combined tension and shear resistance was tested on part of these samples at RT. The combined tension and shear resistance of the samples corresponded to (21.6+/−3.4) MPa.

Another part of these samples was stored for 10 min at 200° C. After they had cooled to RT, these samples were tested at RT. The shear tension samples could be separated without further mechanical stress.

EXAMPLE 6

Adhesive bonds were produced as described under Example 4 and cured, wherein 10% by weight of the expandable graphite NordMin KP 351 (Nordmann & Rassmann) were homogenously admixed to the polyepoxy adhesive as expansion material with the aid of a speed mixer.

The combined tension and shear resistance was tested on part of these samples at RT. The combined tension and shear resistance of the samples corresponded to (22.4+/−0.8) MPa.

Another part of these samples was stored for 10 min at 200° C. After they had cooled to RT, these samples were tested at RT. The shear tension samples could be separated without further mechanical stress.

EXAMPLE 7

Adhesive bonds were produced as described under Example 4 and cured, wherein 10% by weight of the expandable graphite NordMin KP 251 (Nordmann & Rassmann) were homogenously admixed to the polyepoxy adhesive as expansion material with the aid of a speed mixer, and wherein the expandable graphite was encapsulated with melamine formaldehyde (MF) (commercially available from the firm Pharmarom GmbH) by means of coacervation.

The combined tension and shear resistance was tested on part of these samples at RT. The combined tension and shear resistance of the samples corresponded to (22.1+/−1.3) MPa.

Another part of these samples was stored for 10 min at 200° C. After they had cooled to RT, these samples were tested at RT. The shear tension samples could be separated without further mechanical stress.

EXAMPLE 8

Adhesive bonds were produced as described under Example 4 and cured, wherein 10% by weight of the expandable graphite NordMin KP 351 (Nordmann & Rassmann) were homogenously admixed to the polyepoxy adhesive as expansion material with the aid of a speed mixer, and wherein the expandable graphite was encapsulated with melamine formaldehyde (MF) (commercially available from the firm Pharmarom GmbH) by means of coacervation.

The combined tension and shear resistance was tested on part of these samples at RT. The combined tension and shear resistance of the samples corresponded to (23.3+/−0.4) MPa.

Another part of these samples was stored for 10 min at 200° C. After they had cooled to RT, these samples were tested at RT. The shear tension samples could be separated without further mechanical stress.

Examples 7 and 8 show that, in comparison with a reference sample (Example 4), adhesive bonds that comprise the adhesive compositions according to the present invention can be separated without additional mechanical stress, if so required, such that connected samples are neither damaged nor destroyed. In comparison with samples, in which the expansion material is not encapsulated or coated (Examples 5 and 6), the adhesive compositions also ensure an equivalent stability under mechanical stresses.

EXAMPLE 9

Samples of the non-encapsulated and encapsulated expansion materials of the adhesive compositions produced in Examples 6 and 8 were examined by means of ion chromatography. For this purpose, several samples that respectively consisted of 2 g of the expansion materials used (expandable graphite NordMin KP 351) were respectively placed into 4 g of water and shaken at RT. Samples were taken at different times and filtered, and the quantity of released acid in the obtained filtrate was determined by means of ion chromatography.

FIG. 1 shows the quantity of released acid in water for the expansion material NordMin KP 351 of Example 6 and the expansion material NordMin KP 351 of Example 8 that was coated with melamine formaldehyde (MF) by means of coacervation at different times, wherein the respective quantities of released acid were determined by means of ion chromatography.

EXAMPLE 10

Samples of the non-encapsulated and encapsulated expansion materials of the adhesive compositions produced in Examples 5 and 7 were examined by means of ion chromatography. For this purpose, several samples that respectively consisted of 2 g of the expansion materials used (expandable graphite NordMin KP 251) were respectively placed into 4 g of water and shaken at RT. Samples were taken at different times and filtered, and the quantity of released acid in the obtained filtrate was determined by means of ion chromatography.

Figure 2:
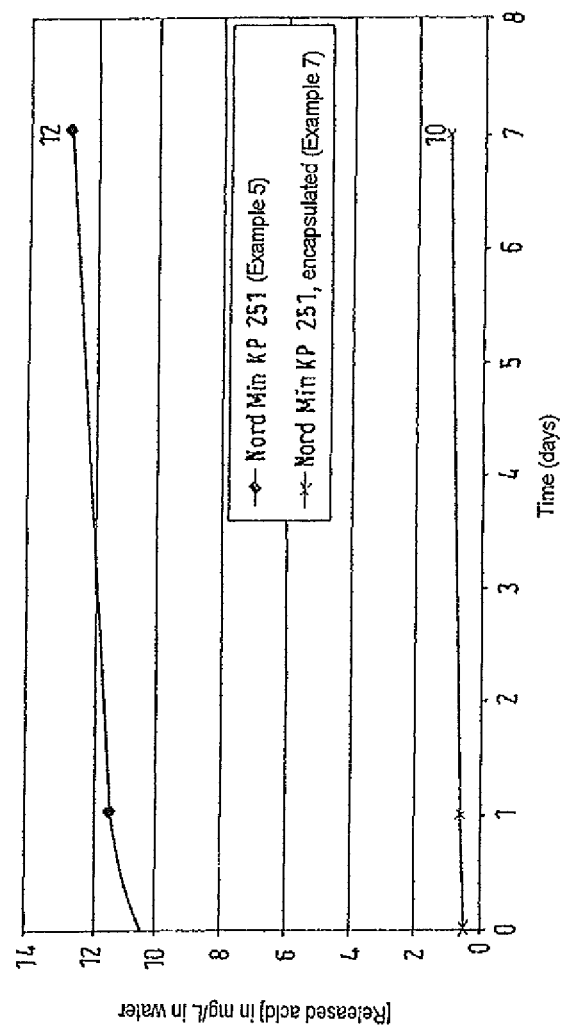
FIG. 2 shows the quantity of released acid in water for the expansion materials of Example 5 and Example 7.

FIG. 2 shows the quantity of released acid in water for the expansion material NordMin KP 251 of Example 5 and the expansion material NordMin KP 251 of Example 7 that was coated with melamine formaldehyde (MF) by means of coacervation at different times, wherein the respective quantities of released acid were determined by means of ion chromatography.

Examples 9 and 10 show that inventive expansion materials release less acid than corresponding expansion materials that are not encapsulated or coated (Examples 5 and 7), and that the adhesive matrix is protected from these reactive components before and after the curing process. The adhesive compositions according to the present invention therefore ensure improved ageing phenomena and a long period of use.

The invention is claimed is:

1. An adhesive composition for separable adhesive bonds, comprising;
an adhesive matrix; and
an expansion material in particulate form, wherein the particles of the expansion material are at least partially encapsulated and/or coated by an encapsulation material and/or coating material,
wherein the expansion material comprises an inorganic expansion material comprising expandable graphite (EG) or organic expansion material comprising azodicarbonamide (ADC),
wherein the encapsulation material or coating material is selected from the group consisting of glass, ceramics, metals, metal oxides, organic-inorganic hybrid systems, melamine formaldehyde resin, parylene and cyanate-based polymer,
wherein the encapsulation material or coating material of the encapsulated expansion material further comprises an active filler, and
wherein the active filler is selected from the group consisting of ferromagnetic, ferromagnetic, superparamagnetic, piezoelectric materials, materials with high thermal capacity or mixtures thereof, barium titanate, ethylenediaminetartrate, potassium-sodium tartrate, lithium sulfate, sodium tartrate, quartz, tourmaline, ferroelectrics with perovskite structure, lead-zirconium titanate, aluminum, cobalt, iron, copper, nickel or their alloys, metal oxides of the type n-maghemite ($\gamma$-Fe2O3), n-magnetite (Fe3O4), ferrites of the general formula MeFe2O4, in which Me stands for bivalent metals of the group cadmium, calcium, cobalt, copper, magnesium, manganese, nickel or zinc, beryllium, boron, calcium, graphite, potassium, magnesium, phosphorus or compounds of the aforementioned materials, aluminum oxide, aluminum chloride, calcium carbonate, calcium chloride, hematite, copper sulfate, magnetite, magnesium carbonate or magnesium chloride, phosphorus chloride, phosphorus oxide and mixtures thereof.

2. The adhesive composition of claim 1, wherein the quantitative proportion of the encapsulated expansion material amounts to 1 to 45% by weight, referred to the total weight of the adhesive composition.

3. The adhesive composition of claim 1, wherein the quantitative proportion of the active filler amounts to 0.1 to 50% by weight, referred to the total weight of the encapsulated expansion material.

4. The adhesive composition of claim 1, wherein the adhesive matrix is selected from the group consisting of hot-melt adhesives, solvent adhesives, contact and dispersion adhesives, water-based adhesives, plastisols, polymerization adhesives, polyaddition adhesives, polycondensation adhesives and mixtures thereof.

5. A bond of at least two components and an adhesive layer, wherein the adhesive layer comprises:
an adhesive composition, the adhesive composition comprising an adhesive matrix and an expansion material in particulate form,
wherein the particles of the expansion material are at least partially encapsulated and/or coated by an encapsulation material and/or coating material,
wherein the expansion material comprises an organic expansion material comprising azodicarbonamide (ADC) or inorganic material comprising expandable graphite (EG),
wherein the encapsulation material or coating material is selected from the group consisting of glass, ceramics, metals, metal oxides, organic-inorganic hybrid systems, melamine formaldehyde resin, parylene and cyanate-based polymer,
wherein the encapsulation material or coating material of the encapsulated expansion material further comprises an active filler, and
wherein the active filler is selected from the group consisting of ferromagnetic, ferromagnetic, superparamagnetic, piezoelectric materials, materials with high thermal capacity or mixtures thereof, barium titanate, ethylenediaminetartrate, potassium-sodium tartrate, potassium tartrate, lithium sulfate, sodium tartrate, quartz, tourmaline, ferroelectrics with perovskite structure, lead-zirconium titanate, aluminum, cobalt, iron, copper, nickel or their alloys, metal oxides of the type n-maghemite (y-Fe2O3), n-magnetite (Fe3O4), ferrites of the general formula MeFe2O4, in which Me stands for bivalent metals of the group cadmium, calcium, cobalt, copper, magnesium, manganese, nickel or zinc, beryllium, boron, calcium, graphite, potassium, magnesium, phosphorus or compounds of the aforementioned materials, aluminum oxide, aluminum chloride, calcium carbonate, calcium chloride, hematite, copper sulfate, magnetite, magnesium carbonate or magnesium chloride, phosphorus chloride, phosphorus oxide and mixtures thereof.

6. The bond of claim 5, wherein the components comprise metal, plastic, wood, glass, natural or synthetic materials or a composite material thereof.

* * * * *